United States Patent Office 3,203,799
Patented Aug. 31, 1965

3,203,799
PHOTOGRAPHIC LAYERS SUITABLE FOR THE SILVER DYESTUFF BLEACHING METHOD
Walter Anderau, Aesch, Basel-Land, Switzerland, assignor to Ciba Limited, Basel, Switzerland, a company of Switzerland
No Drawing. Filed Nov. 17, 1961, Ser. No. 153,199
Claims priority, application Switzerland, Dec. 1, 1960, 13,515/60
9 Claims. (Cl. 96—53)

Yellow dyestuffs are important ground components in substractive color reproduction methods, including the silver dyestuff bleaching method. Apart from the fact that the dyestuffs must have the desired tint, they must satisfy a number of further requirements. More especially, the dyestuffs must have good fastness to light, because they are generally used for the production of pictures to be viewed by reflected light; they must not have a de-sensitizing action on silver bromide; they should be sufficiently soluble in water for use in the above manner and yet be resistant to diffusion; and throughout the series of treatments to which they are subjected, from the manufacture of the photographic material to the production of the finished picture, they must not form turbid flocculations.

The present invention is based on the observation that these requirements are fulfilled particularly well by a certain group of yellow azo-dyestuffs which is defined below and as an example of which there may be mentioned the dyestuff of the formula (1) 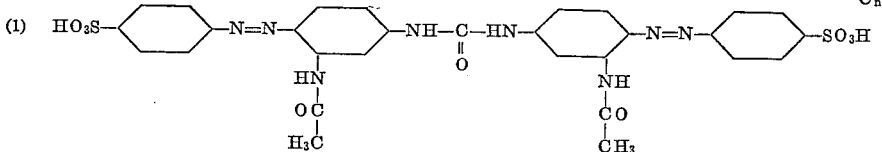

Accordingly the invention provides photographic layers suitable for the silver dyestuff bleaching method, which contain at least one dyestuff of the formula (2) 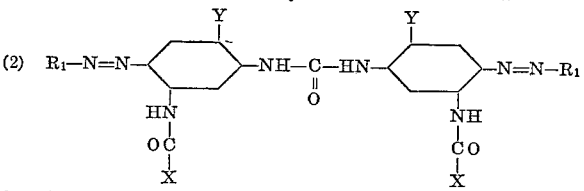

in which $R_1$ represents the radical of a monocyclic diazo-component of the benzene series containing at least one acid group imparting solubility in water, X represents an aliphatic hydrocarbon radical which may be substituted by a hydroyl group, and Y represents a hydrogen atom or a methyl group.

Some of the dyestuffs of the Formula 2 are known, and the dyestuffs can be made in known manner by linking together by means of one molecular proportion of phosgene two molecular proportions of an aminoazo-dyestuff of the formula (3) 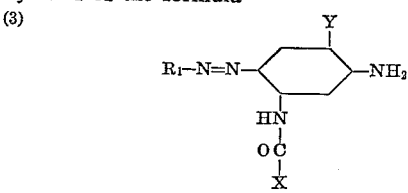

in which $R_1$, X and Y have the meanings given above. The aminoazo-dyestuffs of the Formula 3 are obtained by coupling a diazo-compound of a monocyclic amine of the benzene series ($R_1$—$NH_2$), which contains at least one group imparting solubility in water, for example, a carboxylic acid group or preferably a sulfonic acid group, with an aminobenzene of the formula (4) 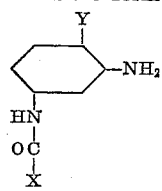

in which X and Y have the meanings given above.

The amines of the formula $R_1$—$NH_2$ used as diazo-components may contain, for example, a benzene nucleus which contains, in addition to the amino group, one or two sulfonic acid groups and advantageously no other substituents.

As examples of diazo-components of the formula $R_1$—$NH_2$ there may be mentioned 1-aminobenzene-2-, -3- and 4-sulfonic acid, 1-amino-2-methylbenzene-4-sulfonic acid, 1-amino-3-acetylaminobenzene-6-sulfonic acid and 1-amino-benzene-2:4- and -2:5-disulfonic acid.

As coupling components required for making of the aminoazo-dyestuffs of the Formula 3 there are advantageously used those of the formula (5) 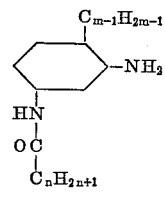

in which m is 1 or 2, and n is a whole number not greater than 11. Higher alkyl radicals $C_nH_{2n+1}$, which may be branched or preferably unbranched, are particularly desirable when the molecule is to be enlarged, for example, to improve the fastness to diffusion of the dyestuff. As examples of suitable coupling components there may be mentioned the 1-aminobenzenes and 1-amino-6-methyl-benzenes that contain in the 3-position an acetylamino, propionylamino, butyrylamino, isobutyrylamino, caprylamino-($H_{15}C_7CONH$—), laurylamino-($H_{23}C_{11}CONH$—) or a hydroxyacetylamino group.

The aminoazo-dyestuffs of the Formula 3 can be made from diazo-components of the formula $R_1$—$NH_2$ and coupling components of the Formula 4 in the usual manner, and the linking of the aminoazo-dyestuffs at the amino groups with phosgene to form the urea derivatives of the Formula 2 may also be carried out in known manner.

The photographic layers of the invention, which contain at least one dyestuff of the Formula 2, are made and used for the production of color photographs, in known manner.

The dyestuffs of the Formula 2 are more especially incorporated in a multi-layer material of the kind having on a transparent or white-pigmented support a silver bromide emulsion layer dyed with a greenish blue dyestuff and selectively sensitized to red, on this layer a silver bromide emulsion layer dyed purple and selectively sensitized to green, and finally a blue sensitive emulsion dyed yellow with a dyestuff of the Formula 2.

The following examples illustrate the invention:

*Example 1*

A solution of 4 grams of the dyestuff of the Formula 1 in 200 cc. of water is mixed with 12 cc. of a saponine solution of 8% strength, and the mixture is added to 1 kg. of a silver bromide gelatine emulsion containing 30 to 35 grams of silver in the form of silver bromide. The whole is homogenized, deaerated and the mixture is then cast on a suitable support, for example, an acetyl-cellulose film. When dry, the film is exposed under a yellow component negative, and the layer is treated in the following manner:

(1) The silver image is developed for 8 minutes at 20° C. in a bath containing in 1 liter of water 0.75 gram of N-methyl-para-aminophenol, 3 grams of hydroquinone, 25 grams of sodium sulfite, 40 grams of sodium carbonate and 1 gram of potassium bromide;

After drying, a yellow component image is obtained.

This image layer may also constitute one of the three layers of a multilayer material.

Yellow layers made and developed in this manner are distinguished by their high fastness to light, and the areas, from which the yellow dyestuff has been completely bleached out, are colorless and do not become yellow even after prolonged exposure to light.

*Example 2*

The procedure is the same as described in Example 1, except that instead of the dye of the Formula 1 one of the dyestuffs of the following formulae is used:

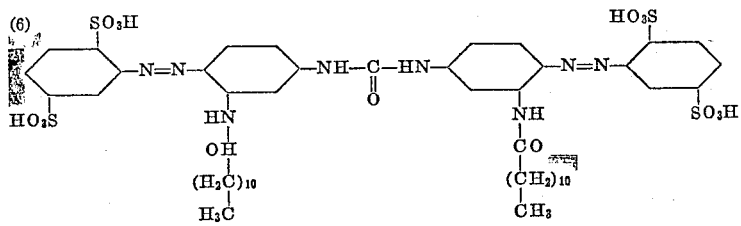

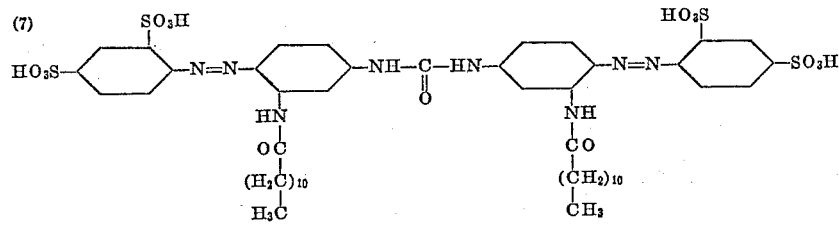

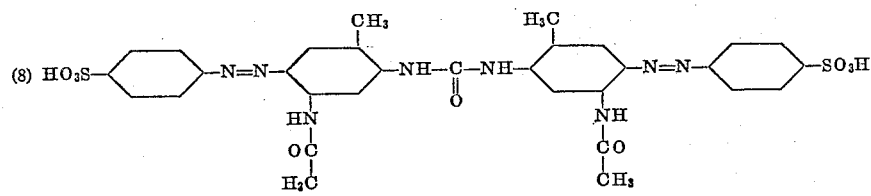

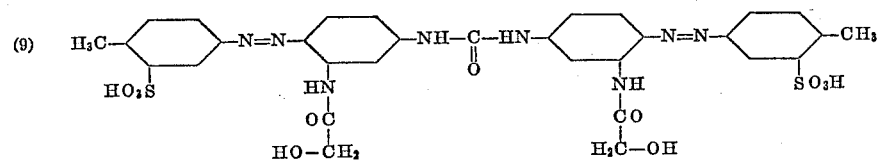

(2) rinsed in water for 3 minutes;
(3) fixed for 5 minutes in a solution containing, per liter of water, 200 grams of sodium thiosulfate and 20 grams of potassium metabisulfite;
(4) rinsed in water for 5 minutes;
(5) hardened for 5 minutes in an aqueous formaldehyde solution of 4% strength;
(6) rinsed for 5 minutes;
(7) the color image is bleached for 10 to 20 minutes in a solution containing, per liter of water, 60 to 100 grams of potassium bromide, 40 to 75 grams of thiourea, 35 to 80 grams of hydrochloric acid of 30% strength and 0.001 gram of aminohydroxyphenazine;
(8) rinsed in water for 10 minutes;
(9) the residual silver is bleached out for 10 minutes in a solution of 60 grams of copper sulfate, 80 grams of potassium bromide and 15 grams of hydrochloric acid of 30% strength in 1 liter of water;
(10) rinsed in water for 5 minutes;
(11) fixed for 5 minutes as under (3) above; and
(12) rinsed in water for 10 minutes.

The layers each containing one of the above dyestuffs have the advantages mentioned at the end of Example 1.

What is claimed is:

1. A photographic layer for the silver dyestuff bleaching process, which contains silver halide and at least one dyestuff of the formula

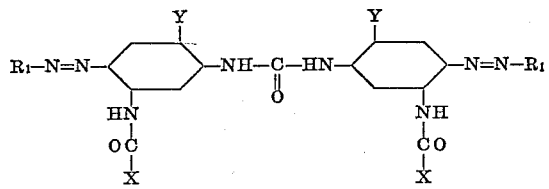

in which $R_1$ represents the radical of a monocyclic diazo component of the benzene series containing at least one acid group imparting solubility in water, X represents a member selected from the group consisting of an aliphatic hydrocarbon radical and an aliphatic hydrocarbon radical containing a hydroxyl group, and Y represents a member selected from the group consisting of a hydrogen atom and a methyl group.

2. A photographic layer for the silver dyestuff bleaching process, which contains silver halide and at least one dyestuff of the formula

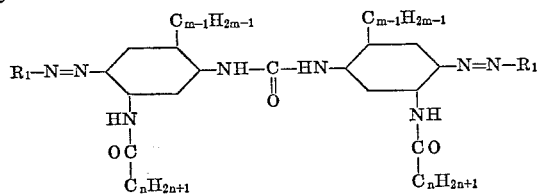

in which $R_1$ represents the radical of a monocyclic diazo component of the benzene series, $m$ represents a whole number of at the most 2, and $n$ represents a whole number of at the most 11.

3. A photographic layer for the silver dyestuff bleaching process, which contains silver halide and at least one dyestuff of the formula

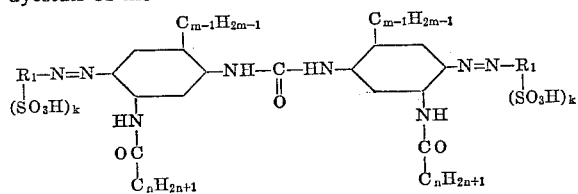

in which $R_1$ represents a benzene radical, $k$ and $m$ each represents a whole number of at the most 2, and $n$ represents a whole number of at the most 11.

4. A photographic layer for the silver dyestuff bleaching process, which contains silver halide and the dyestuff of the formula

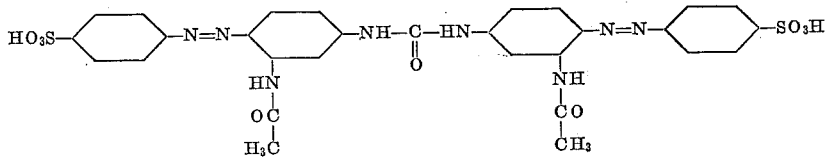

5. A photographic layer for the silver dyestuff bleaching process, which contains silver halide and the dyestuff of the formula

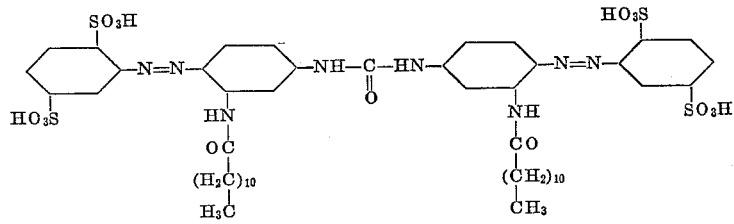

6. A photographic layer for the silver dyestuff bleaching process, which contains silver halide and the dyestuff of the formula

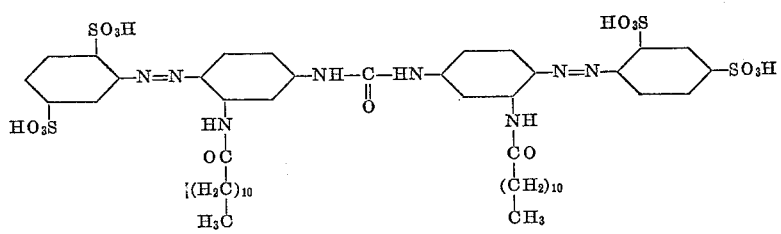

7. A photographic layer for the silver dyestuff bleaching process, which contains silver halide and the dyestuff of the formula

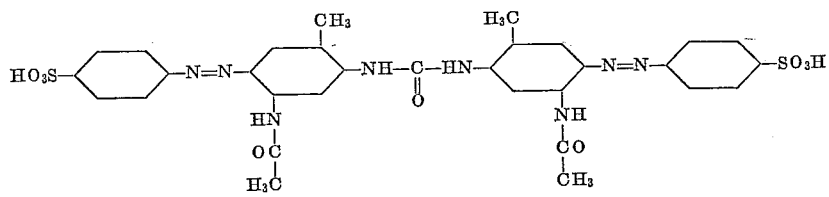

8. A photographic layer for the silver dyestuff bleaching process, which contains silver halide and the dyestuff of the formula

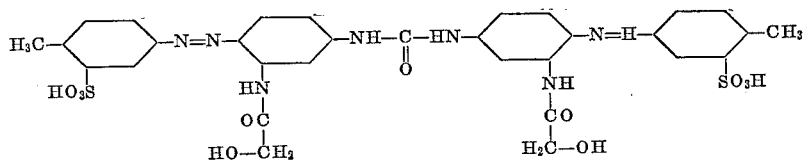

9. A process for the production of a yellow image in a photographic silver halide layer by the silver dyestuff bleaching process, which comprises using at least one dyestuff of the formula

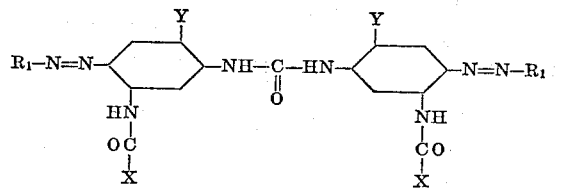

in which $R_1$ represents the radical of a monocyclic diazo component of the benzene series containing at least one acid group imparting solubility in water, X represents a member selected from the group consisting of an aliphatic hydrocarbon radical and an aliphatic hydrocarbon radical containing a hydroxyl group, and Y represents a member selected from the group consisting of a hydrogen atom and a methyl group.

References Cited by the Examiner
UNITED STATES PATENTS

| | | | |
|---|---|---|---|
| 2,273,094 | 2/42 | Fischer et al. | 260—175 |
| 2,294,892 | 9/42 | Carroll et al. | 96—53 |
| 2,294,893 | 9/42 | Carroll et al. | 96—53 X |
| 2,712,006 | 6/55 | Suckfull et al. | 260—175 |

OTHER REFERENCES

Cornwell-Clyne, "Colour Cinematography," page 420, Chapman & Hall, Ltd., 37 Essex Street, London (1951).

NORMAN G. TORCHIN, *Primary Examiner.*
LOUISE P. QUAST, *Examiner.*

UNITED STATES PATENT OFFICE
CERTIFICATE OF CORRECTION

Patent No. 3,203,799                           August 31, 1965

Walter Anderau

It is hereby certified that error appears in the above numbered patent requiring correction and that the said Letters Patent should read as corrected below.

Columns 5 and 6, the left-hand portion of the formula in claim 6 should appear as shown below instead of as in the patent:

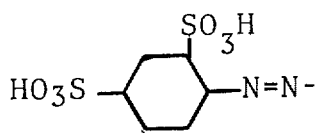

Signed and sealed this 15th day of March 1966.

(SEAL)
Attest:

ERNEST W. SWIDER                                  EDWARD J. BRENNER
Attesting Officer                                         Commissioner of Patents